Dec. 23, 1958 W. A. OMOHUNDRO 2,866,073
PORTABLE ELECTRIC FAN HEATER
Filed Sept. 3, 1957 2 Sheets-Sheet 1
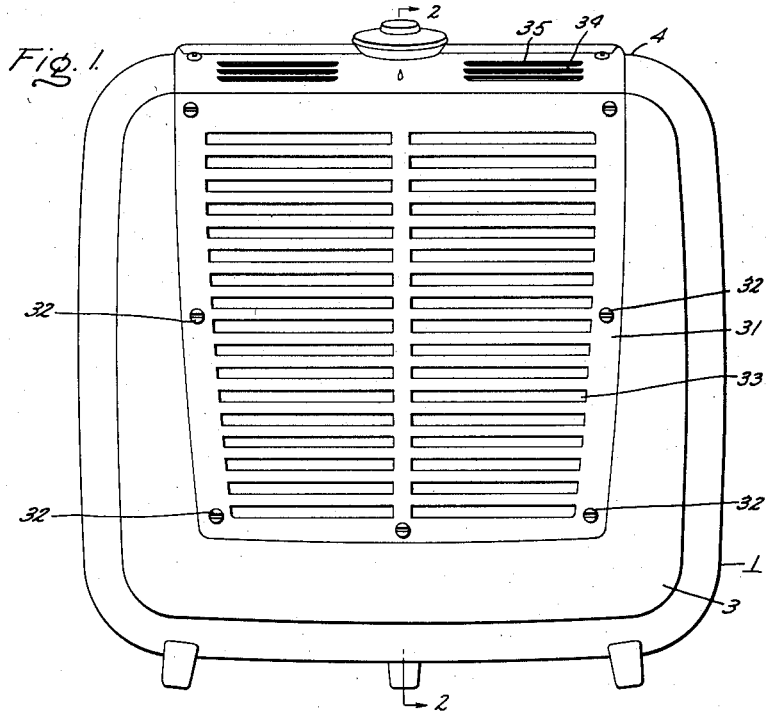
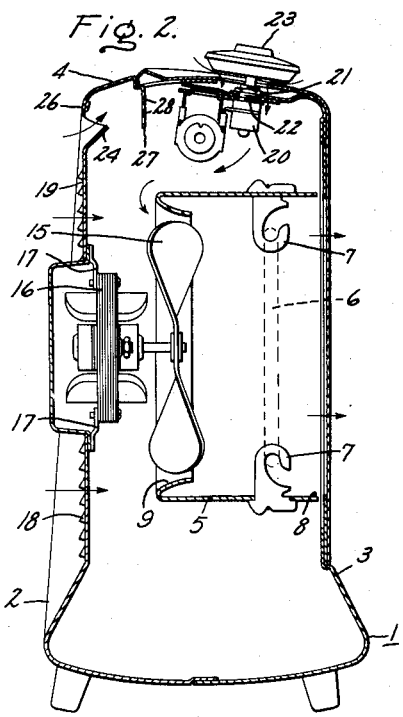
Inventor:
William A. Omohundro,
His Attorney.

Dec. 23, 1958　　　　W. A. OMOHUNDRO　　　　2,866,073
PORTABLE ELECTRIC FAN HEATER
Filed Sept. 3, 1957　　　　　　　　　　　　2 Sheets-Sheet 2

Inventor:
William A. Omohundro,
by Leonard J. Platt
His Attorney.

United States Patent Office 2,866,073
Patented Dec. 23, 1958

2,866,073

PORTABLE ELECTRIC FAN HEATER

William A. Omohundro, Bridgeport, Conn., assignor to General Electric Company, a corporation of New York Application September 3, 1957, Serial No. 681,791

5 Claims. (Cl. 219—39)

This invention relates to portable electric fan heaters and more particularly to the construction of a heater for providing an improved air-flow pattern therethrough and a handle arrangement therefor.

Portable electric fan heaters which are provided with a handle for carrying the heater, and thermostat means for controlling energization of the heater to maintain a room at a desired temperature, provide a valuable addition to the heating art; but the extent of their use depends to a great degree on the ease with which the heater may be picked up and carried about and the reliability of the thermostat for sensing room temperature and controlling the heater in accordance therewith, in contrast with the much higher temperature of the air forced out of the heater.

Accordingly, this invention has as an object the provision of a portable electric heater construction having an improved air-flow pattern for providing reliable thermostat control of the heater, and a handle so located in the air-flow pattern as to be maintained at a comfortable temperature.

It is a further object of this invention to simplify the construction of a handle for a heater and the means for establishing an improved air-flow pattern through the heater.

In accordance with one aspect of this invention an electric fan heater is provided with a sheet metal casing having front, rear, and top walls. An air duct having an inlet orifice and an outlet is spaced within the casing and a discharge opening is formed in the front wall of the casing adjacent to the outlet. An electric heating element is located in the air duct and a fan is positioned in the inlet orifice of the air duct for forcing air over the heating element, through the outlet, and through the discharge opening. A thermostat is fixed to the top wall of the casing for controlling the heating element. An enlarged lanced out handle opening is formed in the rear wall of the casing behind the thermostat and a handle is positioned above the handle opening. By this arrangement, the fan may draw air which is approximately at room temperature through the handle opening and around the thermostat. Thus, the handle for the heater is maintained at a comfortable temperature and the thermostat is caused to sense the temperature of the room air which is drawn inwardly through the enlarged handle opening by the fan.

Other objects and attendant advantages of this invention will be apparent from the following description taken in connection with the accompanying drawing in which:

Fig. 1 is a front elevational view of the improved electric fan heater;

Fig. 2 is a cross-sectional view of the improved electric fan heater taken generally along line 2—2 of Fig. 1;

Figure 3:
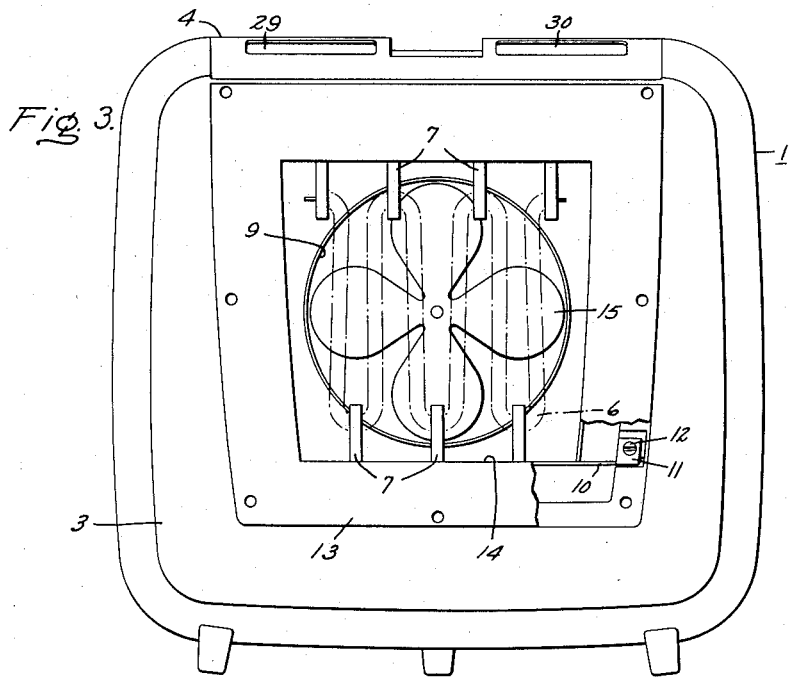
Fig. 3 is a front elevational view of the improved electric fan heater with the grill removed and a portion of the front panel broken away.

Referring now to Fig. 2 of the drawing, there is illustrated an electric fan heater having an outer casing or shell 1 which is preferably constructed of sheet metal and includes a rear wall 2, a front wall 3, and a curved or rounded top wall 4.

As shown more particularly in Fig. 2 and Fig. 3, the heater is provided with a hot air duct 5 having an electric heating element 6 suitably mounted therein on ceramic insulators 7. Air duct 5 which may be generally trapezoidal in cross-section, is preferably formed of sheet metal and may be provided with an outlet 8 and a generally venturi shaped inlet orifice 9. As shown, duct 5 is spaced within outer casing 1 of the fan heater to permit the flow of relatively cool air in the spaces between the outer surface of the hot air duct and casing 1. As illustrated in Fig. 3, a plurality of outwardly extending portions 10 having flanges 11 provided thereon, are preferably formed integrally with duct 5 for fastening the air duct to front wall 3 in any suitable manner, preferably by screws 12.

Front wall 3 of the fan heater includes a front panel 13 having an enlarged air discharge opening 14 formed therein. Front panel 13 is preferably formed of sheet metal and air discharge opening 14 is of such size that the edges thereof substantially match with the edges of outlet 8 of air duct 5 to permit passage of the hot air discharged through hot air duct 5.

Figure 4:
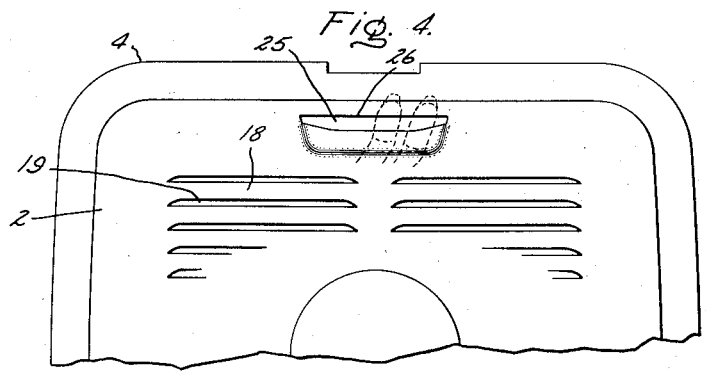
Fig. 4 is a fragmentary rear elevational view of my improved electric fan heater.

As shown in Fig. 2, fan 15 is centrally located in inlet orifice 9 for drawing air into the spaces between the outer surface of hot air duct 5 and casing 1 and for forcing air through air duct 5. An electric motor 16 is provided for driving fan 15. As illustrated, motor 16 may be connected to rear wall 2 of the fan heater by brackets 17 which are suitably fastened to the rear wall and motor 16. As shown in Figs. 2 and 4, a plurality of outwardly extending louvers 18 are formed in rear wall 2 of the fan heater casing 1 in order to provide air inlet openings 19 through which air is drawn by fan 15.

A unique handle and thermostat arrangement is provided so that the handle may be easily formed and maintained at a comfortable temperature, and that the thermostat is positioned so as to be responsive to room temperature and to be substantially unaffected by operation of heating element 6. As shown more particularly in Fig. 2, a thermostat 20 is fixed to top wall 4 of the heater casing by means of a nut 21 and a threaded member 22 or other suitable securing means; thermostat 20 being spaced from hot air duct 5 so as to be substantially unaffected by any heat which may be radiated therefrom. In a manner known in the art, a manually movable knob 23 may be provided for adjusting the setting of thermostat 20, and thermostat 20 controls heating element 14 and electric motor 16 in accordance with the temperature of the medium sensed. In order to provide an easily formed handle and air inlet opening, a top rear wall 2 is lanced and struck inwardly as at 24 to provide an elongated opening 25 as viewed more particularly in Fig. 4. The portion of rear wall 2 above depressed portion 24 is bent inwardly and upwardly to provide a smooth rounded handle 26 for the fan heater. With this construction, fan 15 may draw air at room temperature inwardly through handle opening 25 for cooling handle 26 and for allowing air at substantially room temperature to surround thermostat 20 so that the thermostat will respond to room temperature. As illustrated in Fig. 4, in addition to performing the function of an air inlet opening, opening 25 also functions as a handle opening for receiving the fingers of a hand. Thus, if it is desired to move the heater, it is merely necessary to insert the fingers into opening 25, grip handle 26 and pick up the heater.

It can be seen from the foregoing that the handle for the heater and an air inlet for the thermostat are easily formed from rear wall 2 of the heater. Furthermore, the sheet metal rear wall provides both the handle and the opening, thus permitting elimination of the separate elements which generally are considered to be necessary to provide a handle and an opening. It is clear that this arrangement is characterized by its simplicity and economy.

As shown in Fig. 2, a portion 27 of top wall 4 may be lanced and downwardly bent to serve as a barrier for objects which might be inserted in handle opening 25 and which otherwise might come in contact with thermostat assembly 21. Preferably, barrier 27 has a plurality of holes 28 pierced in it which allow cool air entering handle opening 25 to pass through the barrier to thermostat 20. As shown more particularly in Fig. 3, suitable air inlet openings 29 and 30 may be formed in the top wall 4 of the fan heater casing on opposite sides of thermostat 20 for permitting fan 15 to draw additional cool room temperature air into the heater casing in the vicinity of thermostat 20.

In order to restrict access to heating element 6 and thermostat assembly 20, as shown in Fig. 1, a grill 31 is fixed to the front and top wall of the fan heater casing by screws 32 or other suitable securing means. Preferably, front screws 32 extend through panel 13 of front wall 3 and grill 31 in order to secure both of these members to front wall 3 of the casing. As illustrated, grill 31, has a plurality of slots 32, formed in the front wall thereof to permit the free flow of hot air from the fan heater. Inwardly bent louvers 34 are formed in the top portion of grill 30 to provide suitable openings 35 for the in-flow of cool room air to thermostat assembly 21. Referring now to Figs. 1 and 2 of the drawing, it can be seen that both louvers 34 and inwardly depressed wall portion 24 are formed to direct air upwardly toward the top wall 4 of the casing and thermostat assembly 20.

The improved air flow pattern of the heater will now be more particularly described. As shown in Figs. 2 and 3, handle opening 25 and openings 29 and 30 are relatively large and a strong flow of cool air is caused to flow upwardly through these openings and around thermostat 20, thus causing the thermostat to be responsive to the temperature of this relatively cool air which is approximately at room temperature. The cool air which enters the casing through opening 25 also maintains handle 26 at a comfortable temperature so that it may be readily gripped. This relatively cool first air stream then flows downwardly over the top of air duct 5 to pick up heat and cool the top of the air duct, and is then forced further downwardly through inlet orifice 9 by fan 15. The air then passes through duct 5 where it is heated by heating element 6, and is caused to be discharged through outlet 8, discharge opening 14 and slots 33.

A second air stream is caused to flow inwardly through openings 19 in the rear wall of the casing. As this second air stream enters the casing, a portion thereof passes around motor 16 to cool the motor and additional portions thereof are circulated through the spaces between the hot air duct 5 and the casing walls to pick up heat and to minimize the transfer of heat from the hot air duct to the casing walls. This second air stream then joins the first air stream at inlet orifice 9 and passes through hot air duct 5 along with the first air stream.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States:

1. A fan heater comprising a sheet metal casing having front, rear, and top walls; an air duct having an inlet orifice and an outlet positioned in said casing; an air discharge opening formed in said front wall adjacent to said outlet; an electric heating element located in said air duct; a fan positioned in said inlet orifice for forcing air over said heating element through said outlet and through said discharge opening; a thermostat fixed to the top wall for controlling said heating element; an enlarged lanced out opening formed in the rear wall behind said thermostat for permitting said fan to force ambient air into intimate contact with said thermostat and to surround said thermostat; and a handle positioned above said handle opening, said fan also causing air to be drawn through said handle opening and over said handle for cooling said handle.

2. A fan heater comprising a sheet metal casing having front, rear, and top walls; an air duct having an inlet orifice and an outlet positioned in said casing; an air discharge opening formed in said front wall adjacent to said outlet; and an electric heating element located in said air duct; a fan positioned in said inlet orifice for forcing air over said heating element through said outlet and through said air discharge opening; a thermostat fixed to said top wall for controlling said heating element; an enlarged lanced out handle opening formed in the rear wall behind said thermostat for permitting said fan to force ambient air into intimate contact with said thermostat and to surround said thermostat; and an upwardly bent handle formed from said rear wall above said lanced out handle opening, said fan also causing air to be drawn through said handle opening and over said handle for cooling said handle.

3. A fan heater comprising a sheet metal casing having front, rear, and top walls; an air discharge opening formed in said front wall; an air duct connected to said front wall, said duct having an inlet orifice spaced from said rear wall and an outlet located adjacent to said discharge opening; an electric heating element located in said air duct; a fan positioned in said inlet orifice for forcing air over said heating element through said outlet and through said discharge opening; a thermostat fixed to the top wall for controlling said heating element; and an enlarged lanced out handle opening formed in the rear wall behind said thermostat for permitting said fan to force ambient air into intimate contact with said thermostat and to surround said thermostat, said casing being inwardly bent below said opening to form a deflector for directing said forced air toward said thermostat, said fan also causing air to be drawn through said handle opening and over said handle for cooling said handle.

4. A fan heater comprising a sheet metal casing having front, rear, and top walls; an air duct having an inlet orifice and an outlet positioned in said casing; an air discharge opening formed in said front wall adjacent to said outlet orifice; an electric heating element located in said air duct; a fan positioned in said inlet orifice for forcing air over said heating element through said outlet and through said air discharge opening; a thermostat fixed to the top wall for controlling said heating element; an enlarged lanced out handle opening formed in the rear wall behind said thermostat, and a barrier having a plurality of holes formed therein extending downwardly from said top wall between said thermostat and said handle opening, said fan causing air to be drawn through said handle opening through said holes, and around said thermostat.

5. A fan heater comprising a sheet metal casing having front, rear, and top walls; a hot air duct connected to said front wall, said duct having an inlet orifice and an outlet; an air discharge opening formed in said front wall adjacent to said outlet; air inlet openings formed in said rear wall; an electric heating element located in said air duct; a fan positioned in said inlet orifice for forcing air over said heating element and through said outlet; a thermostat for controlling said heating element fixed to the top wall above said hot air duct; air inlet openings formed in the top wall of said casing on opposite sides of said thermostat; and an enlarged handle opening formed in said rear wall behind said thermostat, whereby a first air stream may flow into the heater through said air openings in the top wall and the handle opening into intimate contact with said thermostat to the fan, and a second air stream may flow through the air inlet openings formed in said rear wall to the fan.

References Cited in the file of this patent

UNITED STATES PATENTS

| | | |
|---|---|---|
| 2,492,248 | Weingardt | Dec. 27, 1949 |
| 2,765,393 | Theisen | Oct. 2, 1956 |